United States Patent
Aldridge et al.

(10) Patent No.: US 11,115,296 B2
(45) Date of Patent: Sep. 7, 2021

(54) CONTROL UNIT FOR DISPLAYING A LOAD OF A NETWORKING CABLE

(71) Applicant: International Business Machines Corporation, Armonk, NY (US)

(72) Inventors: Mamie B. Aldridge, Smyrna, GA (US); Lokesh N. Gopu, Morrisville, NC (US); Dawn Grosse Huelsewiesche, Alpharetta, GA (US); Jody B. Hasten, IV, Round Rock, TX (US); Moazzam Khan, Marietta, GA (US); Lynn E. Lowrie, Marietta, GA (US); Stuart McDonald, King George, VA (US); Edward A. Romero, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 16/053,046

(22) Filed: Aug. 2, 2018

(65) Prior Publication Data

US 2020/0044947 A1    Feb. 6, 2020

(51) Int. Cl.
*H04L 12/26* (2006.01)
*G06T 7/90* (2017.01)
*H04L 12/24* (2006.01)

(52) U.S. Cl.
CPC ............. *H04L 43/04* (2013.01); *G06T 7/90* (2017.01); *H04L 41/22* (2013.01); *H04L 43/0876* (2013.01)

(58) Field of Classification Search
CPC ..... H04L 43/04; H04L 43/0876; H04L 41/22; G06T 7/90

USPC ........................................................ 370/229
See application file for complete search history.

(56) References Cited

U.S. PATENT DOCUMENTS

| | | | |
|---|---|---|---|
| 5,345,531 A | * | 9/1994 | Keplinger ............... G02B 6/001 385/102 |
| 8,965,747 B2 | | 2/2015 | Zhang et al. |
| 9,722,894 B2 | | 8/2017 | Testin |
| 9,860,177 B2 | | 1/2018 | Kosseifi et al. |
| 2004/0128380 A1 | * | 7/2004 | Chen ..................... G06Q 10/063 709/224 |
| 2006/0041778 A1 | * | 2/2006 | Lizzi ...................... G06F 13/102 714/4.1 |
| 2013/0054204 A1 | | 2/2013 | Zhang et al. |

(Continued)

FOREIGN PATENT DOCUMENTS

| | | |
|---|---|---|
| CN | 102916862 B | 7/2015 |
| CN | 104569901 B | 10/2017 |

OTHER PUBLICATIONS

Unknown, "Led-Lighting Meets Power Over Ethernet," http://www.1000ftcables.com/blog/wp-content/uploads/2016/01/Led-Lighting-meets-power-over-Ethernet.jpg, 1 pg., printed May 9, 2018.

(Continued)

*Primary Examiner* — Chi Tang P Cheng
(74) *Attorney, Agent, or Firm* — Peter K. Suchecki (57) ABSTRACT

Provided is a control unit for displaying a network load sustained on a networking cable. The control unit requests a current network load of the networking cable from a monitoring circuit. The control unit receives the current network load from the monitoring circuit. The control unit instructs a visual indicator to display the current network load of the networking cable.

20 Claims, 7 Drawing Sheets

(56) References Cited

U.S. PATENT DOCUMENTS

| | | | |
|---|---|---|---|
| 2014/0016502 A1* | 1/2014 | Miyamoto | H04L 27/0008 |
| | | | 370/253 |
| 2014/0185829 A1* | 7/2014 | Bongiovi | H03G 5/165 |
| | | | 381/103 |
| 2015/0012648 A1 | 1/2015 | Testin | |
| 2015/0043875 A1* | 2/2015 | Bookbinder | G02B 6/447 |
| | | | 385/100 |
| 2016/0352638 A1 | 12/2016 | Kosseifi et al. | |
| 2017/0285707 A1* | 10/2017 | Cohen | G06F 1/266 |
| 2018/0013723 A1* | 1/2018 | Kirk | H04L 63/0428 |
| 2018/0109107 A1 | 4/2018 | Mosebrook et al. | |
| 2018/0314011 A1* | 11/2018 | Chen | G02B 6/428 |

OTHER PUBLICATIONS

EBay, "black lighted micro usb cable," https://www.ebay.com/sch/i_html?_sacat=0&_nkw=black+lighted+micro+usb+cable&_sop=12, 21 pgs., printed May 9, 2018.

Unknown, "Neo-Neon receives patent for flexible LED cable lighting," http://www.ledsmagazine.com/articles/2005/09/neo-neon-receives-patent-for-flexible-led-cable-lighting.html, 2 pgs., printed May 9, 2018.

Shenzhen Angel Shine Technology Co., Ltd., flexible neon rope light el wire/neon wire/el cable/el light wire 2.3 mm 10 meter per roll (NO Include Inverter), http://www.aliexpress.com/store/product/various-flexible-el-wire-at-high-brightness-in-8-different-colors-with-1-inverter/325601_737168938.html, 4 pgs. printed May 9, 2018.

Dreamrave, "Electro Motion Light Chasing El Wire," https://www.youtube.com/watch?v=5ZvHuAhpxsM, 2 pgs., printed May 9, 2018.

Alibaba, "3 in 1 crystal transparent glowing led light micro usb data cable for iphone 4/6 and andoid," https://phoneyue.en.alibaba.com/product/60585556889-803632708/3_in_1_crystal_transparent_glowing_led_light_micro_usb_data_cable_for_iphone_4_6_and_android.html?spm=a2700.icbuShop.prewdfa4cf.43.55ba4c773e3qNA, printed Aug. 1, 2018, 8 pgs.

CableOrganizer.com, "EVO6 Category 6 LED Traceable Patch Cables," https://www.cableorganizer.com/mertek/evo6-patch-cord/, 4 pgs., printed May 9, 2018.

PatchSee, "Cable Solution," https://www.patchsee.com/en/rj45-patch-cords.php, 2 pgs., printed May 9, 2018.

Certicable Inc., "Tinifiber by CertiCable," https://certicable.com/wallplate_configuration, 3 pgs., printed May 9, 2018.

LanecServices, "LANEC Solutions Self Tracing Patch Cords," https://www.youtube.com/watch?v=ZtggQBdqJG4, 2 pgs., printed May 9, 2018.

LanecServices, "Lanec Solutions Self Tracing Leads," https://www.youtube.com/watch?v=LKpdBb26cWQ, 2 pgs., printed May 9, 2018.

Sleik, R. et al., "Modular Test System Architecture for Device, Circuit, and System Level Reliability Testing and Condition Monitoring," IEEE Transactions on Industry Applications, 53(6), pp. 5698-5708, Nov./Dec. 2017.

DHDGate.com, "LED Visible Micro USB Charger Cable for Samsung Galaxy S5 Universal Data Smile Light Up Micro USB 3.0 1 M FLat Cords for Samsung Note 3 N9000," https://www.dhgate.com/product/led-visible-micro-usb-charger-cable-for-samsung/199386992.html, 11 pgs., printed May 9, 2018.

Amazon, "LED light charging USB data sync cable cord for iPhone X 8 7 6 5 (Light up Red/Green)," https://www.amazon.com/light-charging-cable-iPhone-Light/dp/B078VVPGC9, printed Aug. 1, 2018, 7 pgs.

* cited by examiner

CONTROL UNIT FOR DISPLAYING A LOAD OF A NETWORKING CABLE

BACKGROUND

The present disclosure relates generally to the field of computer networking systems, and more particularly to a control unit for displaying a network traffic load sustained on a networking cable.

Monitoring network traffic on a computer system, server, or the like, is an important tool for maintaining a functioning network. In some instances, high traffic loads may cause an adverse effect on the health of the system. For example, a high traffic load may be indicative of a malware outbreak or a hacking attempt. Alternatively, a low traffic load or no traffic load may indicate an issue with a connected server. Monitoring software may be utilized on a connected device to determine the network traffic load, but this software requires a user to have the device with them to determine the load. In some instances, a user may be without a connected device and desire a physical indicator of the traffic sustained on a network or networking cable.

SUMMARY

Embodiments of the present disclosure include a method, computer program product, and control unit for displaying a network traffic load of a networking cable. The control unit requests the network traffic load of a networking cable from a monitoring circuit via a microcontroller. The control unit receives the current network traffic load of the networking cable from the monitoring circuit. The control unit instructs a visual indicator to display the network traffic load of the networking cable.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer networking systems, and more particularly to a control unit for visually displaying a network load sustained on a networking cable. While the present disclosure is not necessarily limited to such applications, various aspects of the disclosure may be appreciated through a discussion of various examples using this context.

Monitoring network traffic of a computing network is an important task for maintaining a functional network. In many instances, a server room administrator is tasked with monitoring and maintaining the network. However, it may be difficult to monitor the network traffic load while the server room administrator is physically in the server room. Further, server rooms typically include multiple servers that are connected to each other via complicated networking cable patterns. In many instances, it is difficult for the server room administrator to determine a path of each networking cable used to connect specific servers of the network. Embodiments of the present disclosure utilize a control unit to determine the network traffic load of a networking cable, whereby a color corresponding to the determined network traffic is displayed along the length of the cable through a visual indicator. Thus, the present disclosure allows a user to visually determine the current network load of networking cable, while further allowing the user to trace the respective cable from end to end.

For illustrative purposes, embodiments of the present disclosure as applied to an Ethernet cable are described in detail herein. In alternative embodiments, the networking cable may be any type of cable, such as a fiber optic cable. In one embodiment, the control unit is operably connected to the Ethernet cable. However, in alternative embodiments, it is contemplated that the control unit may be wirelessly coupled to the Ethernet cable.

Figure 1:
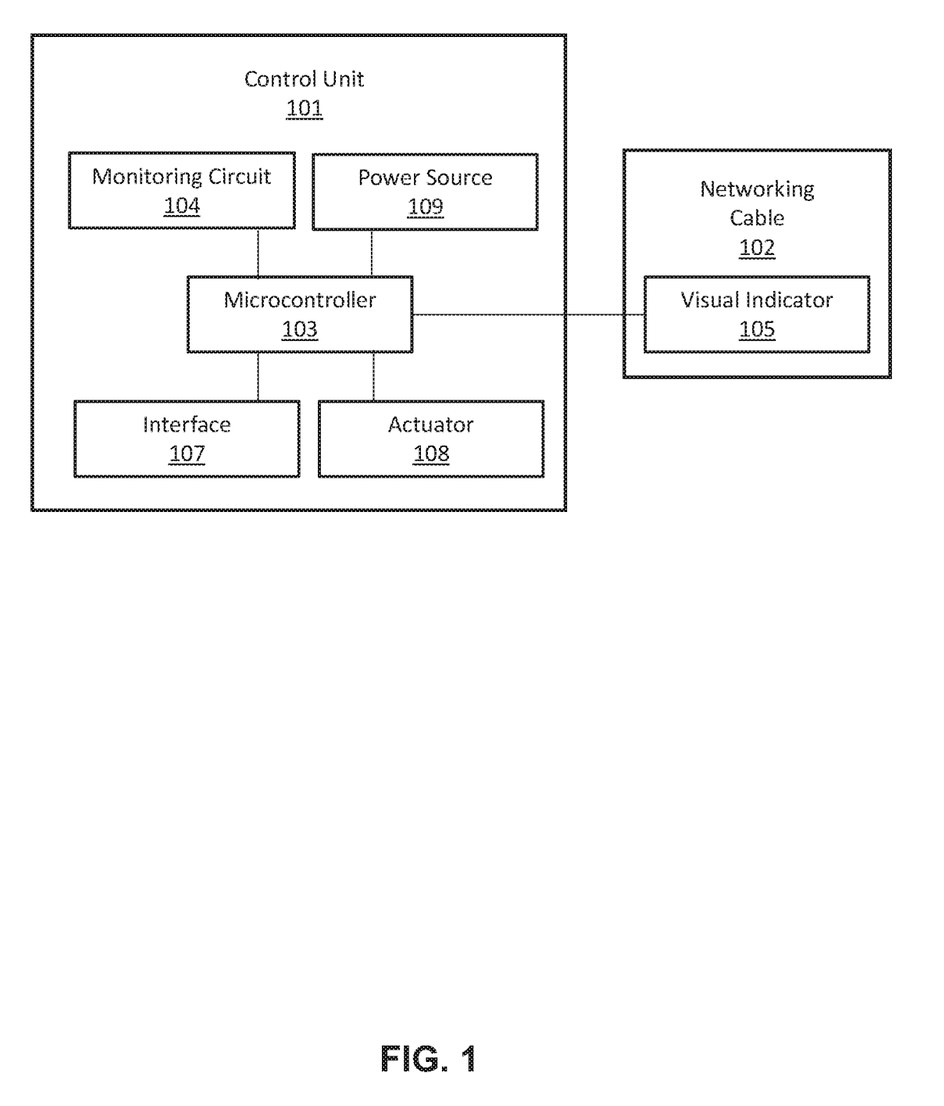
FIG. 1 illustrates a block diagram of a control unit communicatively coupled to a networking cable, in accordance with embodiments of the present disclosure.

Referring now to FIG. 1, shown is a block diagram of a control unit 101 communicatively coupled to a networking cable 102, in accordance with embodiments of the present disclosure. The networking cable may be any type of cable, such as an Ethernet cable or Fiber optic cable. The control unit 101 may be a computer system that may be substantially similar to, or the same as, computer system 1101 described in FIG. 7. In the illustrative embodiment, the control unit 101 includes a microcontroller 103. In some embodiments, the microcontroller 103 may include a processor.

The microcontroller 103 is communicatively coupled to a monitoring circuit 104. The monitoring circuit 104 is configured to monitor the network traffic load sustained on the networking cable 102, such that the monitoring circuit 104 can determine the current network load of the networking cable 102. For example, the monitoring circuit 104 may determine the network load of the networking cable 102 is a high traffic load, medium traffic load, or a low traffic load. The determined network load may be shown by a visual indicator 105 by displaying a color that corresponds to the determined network load, such as red for a high traffic load, yellow for a medium traffic load, and blue for a low traffic load. However, it is contemplated that in alternative embodiments, further network load determinations and color patterns may be used.

The visual indicator 105 is configured to display a color that corresponds to a current network load of the networking cable, as determined by the monitoring circuit. The visual indicator 105 may be any kind of display unit capable of displaying various colors, such as a Red, Blue and Green Light Emitting Diode (RGB LED). The visual indicator 105 is operably connected to the microcontroller 103, such that it can display a color corresponding to the determined load when prompted by the microcontroller 103. In the illustrative embodiment, the visual indicator 105 is disposed within the networking cable 102. However, in alternative embodiments, the visual indicator 105 may be disposed within the control unit 101. In some embodiments, the visual indicator 105 may include a plastic optical fiber that runs the length of the networking cable 102. In this way, the networking cable 102 may be illuminated along its length with a color corresponding to the determined network load, such that a user can easily determine the current network load by looking at the networking cable 102.

In the illustrative embodiment, the control unit 101 further includes an interface 107 that is communicatively coupled to the microcontroller 103. The interface 107 may be any type of interface for communicating with the control unit 101, such as an input port or a graphical user interface (GUI). For example, a user may communicate with the control unit 101 by utilizing the interface 107 to program the microcontroller 103 to display alternative colors or varying levels of network loads. In alternative embodiments, a user may be able to wirelessly communicate with the control unit 101 via a communicatively coupled device, such as a mobile device.

In the illustrative embodiment, the control unit 101 includes an actuator 108 that is communicatively coupled to the microcontroller 103. The actuator 108 is configured to modify the output of the visual indicator (e.g., to blink/strobe the visual indicator 105) when activated. The actuator 108 may be configured as a button, toggle, or switch that can be selectively activated by a user. For example, a user, such as a server room administrator, may activate the actuator 108 to blink the visual indicator 105 disposed along the length of the networking cable 102, thereby allowing the user to visually see where the networking cable 102 begins and ends when hidden within a complex wiring pattern within a server room. In this way, a server room administrator would be able to distinguish one networking cable from another if all the networking cables are equipped with visual indicators, wherein the visual indicators are displaying the same network load color. In some embodiments, the actuator 108 may cause the visual indicator to switch to a unique color (e.g., a color not associated with a network load) to differentiate the networking cable from other cables that may be displaying their respective network loads.

In the illustrated embodiment, the control unit 101 further includes a power source 109. It is contemplated that in one embodiment the networking cable 102 is an Ethernet cable, wherein the power source is a Power over Ethernet (PoE) power source, for example, powered using an IEEE 802.3af standard switch. However, in alternative embodiments, such as where the networking cable is another type of cable, such as a fiber optic cable, the power source 109 may be any type of power source, such as an AC adapter, battery, or solar power source. In this way, utilizing various power source options allows the networking cable to be used for many types of server room implementations. In some embodiments, the networking cable 102 may be powered using any combination of power sources, such a PoE and an AC adapter.

Figure 2:
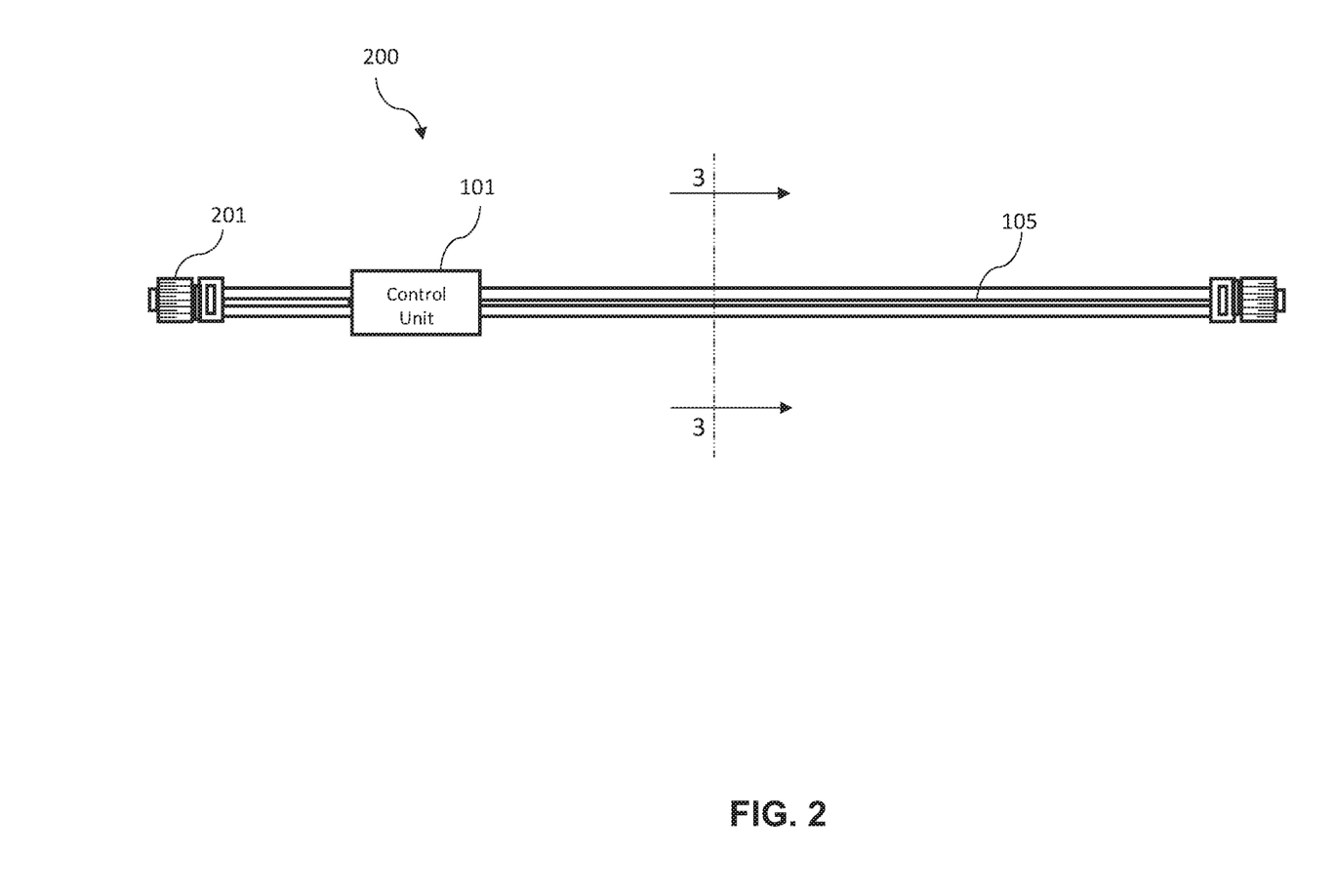
FIG. 2 illustrates an example embodiment of an Ethernet cable with an operably connected control unit, in accordance with embodiments of the present disclosure.

Referring now to FIG. 2, shown is an example embodiment of an Ethernet cable 200 with an operably connected control unit 101, in accordance with embodiments of the present disclosure. In the illustrative embodiment, the networking cable 102 (as referenced in FIG. 1) is exemplified as an Ethernet cable 200, wherein the control unit 101 is operably connected thereto. The Ethernet cable 200 includes a pair of modified RJ45 connections 201 disposed at distal ends thereof. The modified RJ45 connections 201 are configured to allow the monitoring circuit of the control unit 101 to monitor the network load sustained by the Ethernet cable 200.

In the illustrative embodiment, the visual indicator 105 (as referenced in FIG. 1) is disposed along the length of the Ethernet cable 200. The visual indicator 105 displays a color that is associated with the determined network load of the Ethernet cable 200. In this way, a user can easily see and decipher what the current network load of the Ethernet cable 200 is sustaining simply by looking at the cable. For example, a high network load may be displayed by a red color along the length of the Ethernet cable 200. This may be an indication of a hacking attempt, or a network balancing issue. Thus, a user within the server room through visual recognition of the network load for an attached server, can easily remedy the problem by diverting some of the network traffic to an alternative server.

Figure 3:
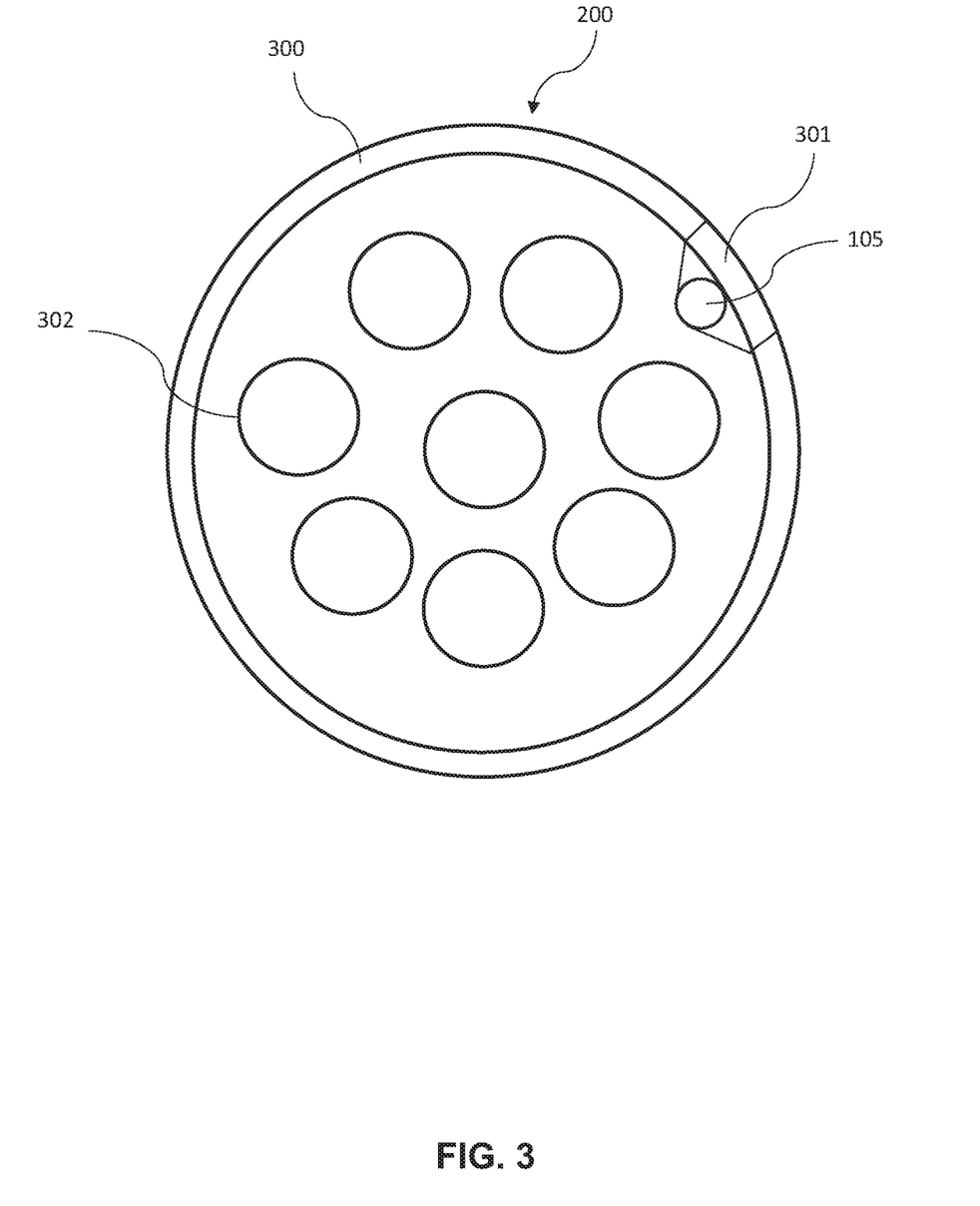
FIG. 3 illustrates a cross sectional view of the example Ethernet cable of FIG. 2 taken along line 3-3, in accordance with embodiments of the present disclosure.

Referring now to FIG. 3, shown is a cross sectional view of the Ethernet cable of FIG. 2 taken along line 3-3, in accordance with embodiments of the present disclosure. In the illustrative embodiment, the visual indicator 105 (as referenced in FIG. 1 and FIG. 2) is disposed beneath a transparent panel 301 that runs the length of the outer sheath 300 of the Ethernet cable 200. The transparent panel 301 is configured to allow the color displayed from the visual indicator 105 to shine through the outer sheath 300 while providing protection to the twisted pair wires 302 and visual indicator 105 disposed within the Ethernet cable 200. In alternative embodiments, the transparent panel 301 may be any size and shape. For example, the transparent panel 301 may run the entire length of the Ethernet cable and have a width that is a quarter length of the circumference of the outer sheath 300. In another embodiment, the entire out sheath 300 may be transparent, obviating the need for the transparent panel 301.

Figure 4:
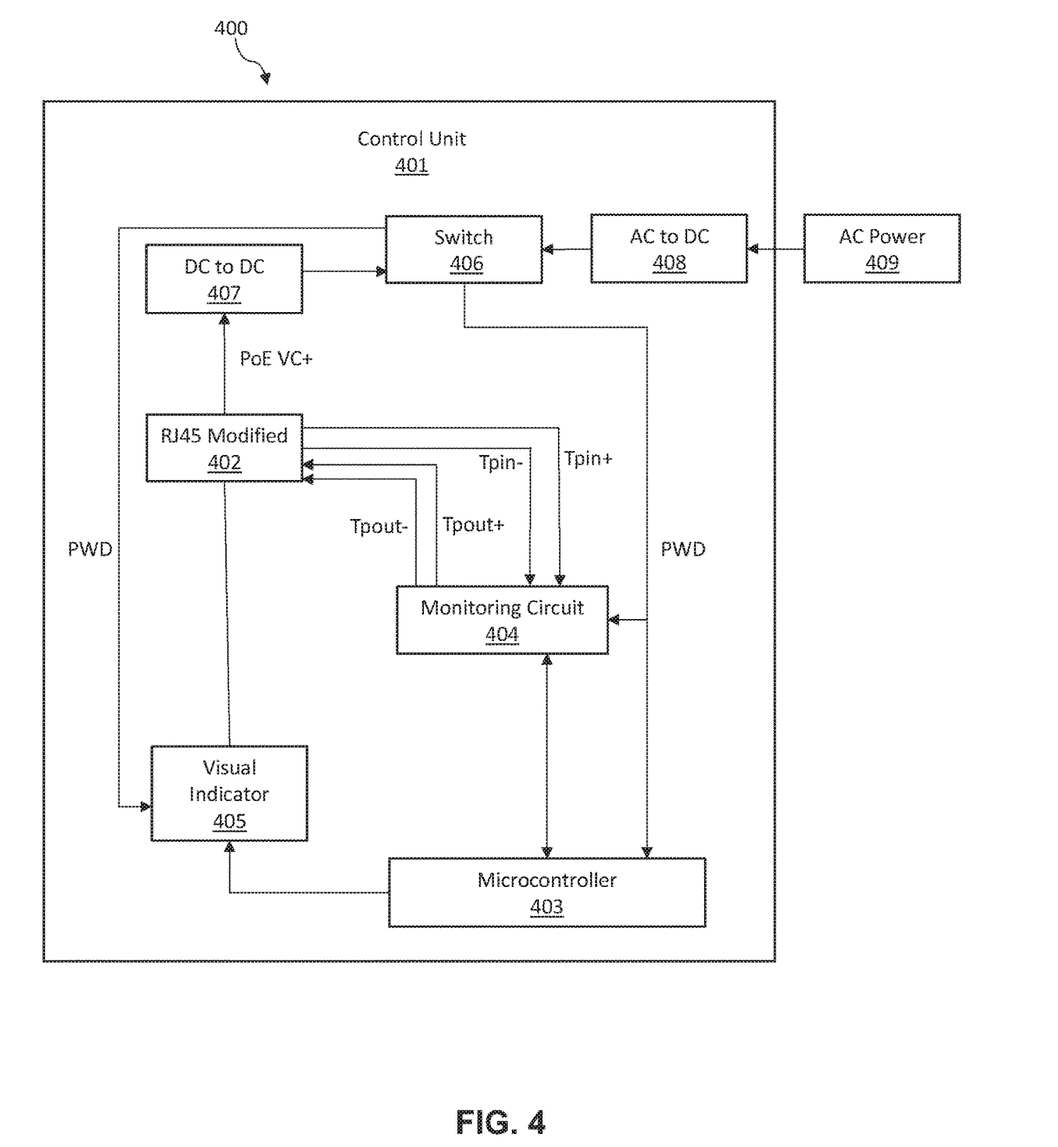
FIG. 4 illustrates an example circuit diagram of the control unit communicatively coupled to an Ethernet cable, in accordance with embodiments of the present disclosure.

Referring now to FIG. 4, shown is an example circuit diagram 400 of the control unit 401 communicatively coupled to an Ethernet cable, in accordance with embodiments of the present disclosure. In the illustrative embodiment, the control unit 401 includes a microcontroller 403 that is communicatively coupled to a monitoring circuit 404, wherein the monitoring circuit is configured to monitor the network traffic load of a communicatively coupled Ethernet cable. The monitoring circuit 404 may be any suitable monitoring circuit, such as an Ethernet to Serial Peripheral Interface (SPI) converter. The monitoring circuit 404 is communicatively coupled to a modified RJ45 connecter 402 of the Ethernet cable, such that incoming and outgoing data can be monitored. The modified RJ45 connector 402 allows the control unit 401 to monitor Ethernet activity, such as the network traffic load sustained by the Ethernet cable. In an alternative embodiment, the control unit 401 may include a port wherein a standard RJ45 connector may be inserted therein, such that the monitoring circuit 404 may monitor network traffic sustained on a standard Ethernet cable.

In one embodiment, the control unit 401 and LED driver of the visual indicator 405 (as described in FIG. 1, FIG. 2, and FIG. 3) are powered through a switch 406 using Power over Ethernet (PoE) via a direct current to direct current 407 power supply. The switch 406 may be any suitable PoE switch, such as an IEEE 802.3af standard switch. Alternatively, when PoE is unavailable, the control unit 401 and LED driver of the visual indicator 405 may be powered through an alternating current (AC) to direct current 408 power supply via AC power 409. The AC power may be generated from any suitable AC power source, such as an AC adapter.

Figure 5:
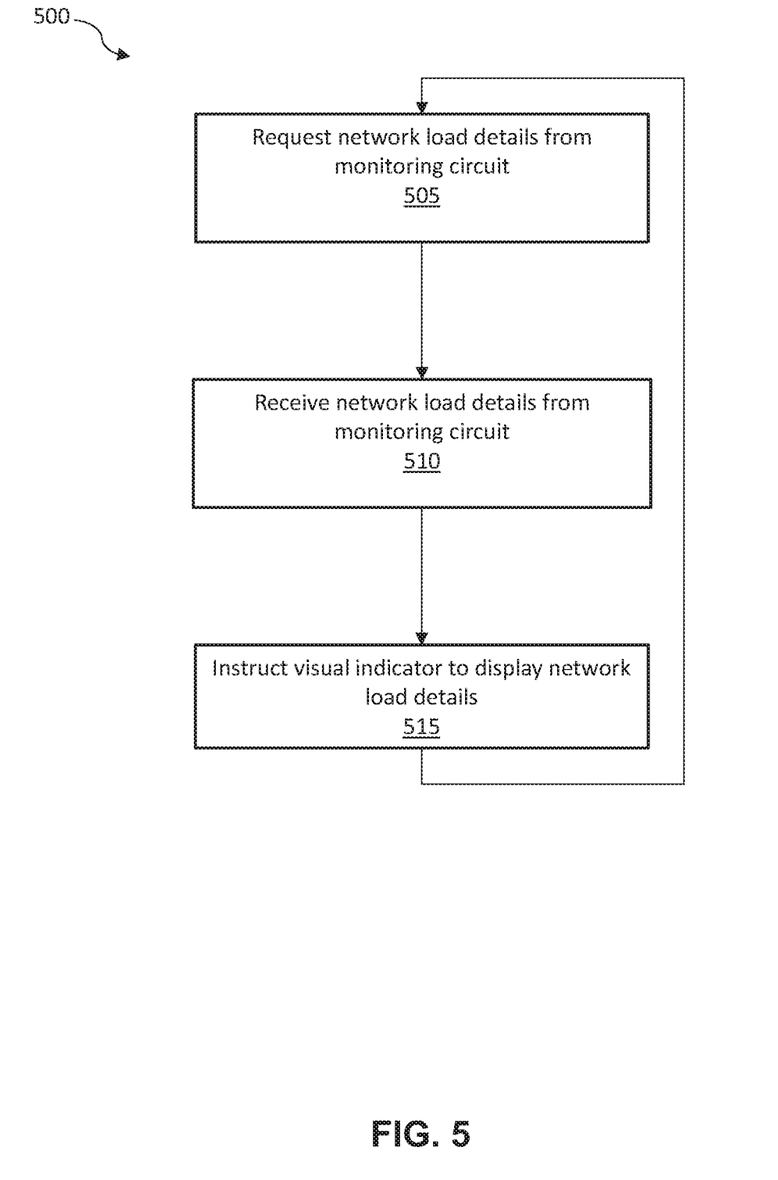
FIG. 5 illustrates a flow diagram of an example process for displaying a network traffic load using a visual indicator, in accordance with embodiments of the present disclosure.

Referring now to FIG. 5, shown is a flow diagram of an example process 500 for displaying a network load using a visual indicator, in accordance with embodiments of the present disclosure. The process 500 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 500 is a computer-implemented process. The process may be performed by a microcontroller exemplified in FIG. 1.

The process 500 begins by the microcontroller requesting the current network load details of a networking cable. This is illustrated by step 505. The network load details may be determined from a monitoring circuit that is communicatively coupled to the microcontroller. The monitoring circuit is further communicatively coupled to the networking cable, such that it can determine the network load details currently sustained by the networking cable.

Once the monitoring circuit determines the current network load details of the networking cable, the process 500 continues by the microcontroller receiving the current network load details of the networking cable. This is illustrated by step 510.

Once the microcontroller receives the current network details, the process 500 continues by the microcontroller instructing a visual indicator to display the received network load details. This is illustrated by step 515. Once instructed, the visual indicator is configured to illuminate to a color corresponding to the current determined network load. In some embodiments, the color corresponding to the current network load is illuminated along the length of the networking cable to visually show the current network load sustained by the networking cable. The process 500 continues to repeat steps 505-515 to constantly update the displayed network load details of the networking cable, such that an accurate network load can be determined at any given time. It is contemplated that the process 500 can be programmed to repeat at various intervals set by a user during programming. In some embodiments, the process 500 is triggered by a user (e.g., pressing a button on the control unit, transmitting a command using a mobile device) and repeats for a period of time (e.g., 5 seconds).

Figure 6:
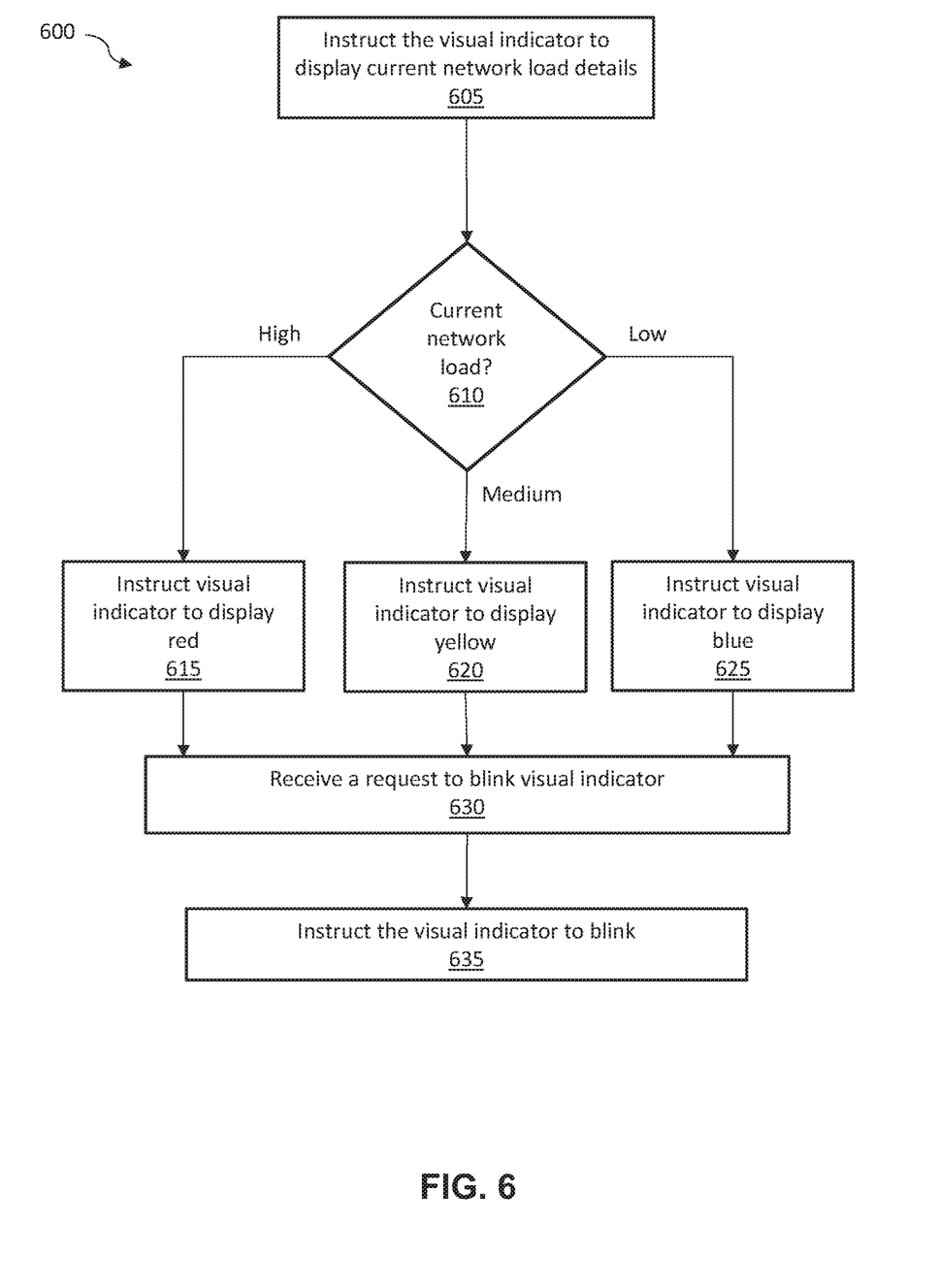
FIG. 6 illustrates a flow diagram of an example process for instructing a visual indicator to display a color corresponding to the network traffic load of a networking cable, in accordance with embodiments of the present disclosure.

Referring now to FIG. 6, shown is a flow diagram of an example process 600 for instructing a visual indicator to display a color corresponding to the network traffic load of a networking cable, in accordance with embodiments of the present disclosure. The process 600 may be performed by processing logic that comprises hardware (e.g. circuitry, dedicated logic, programmable logic, microcode, etc.), software (e.g., instructions run on a processor to perform hardware simulation), firmware, or a combination thereof. In some embodiments, the process 600 is a computer-implemented process. The process 600 may be performed by a microcontroller exemplified in FIG. 1.

Process 600 further defines step 515 of process 500, by providing details on color determination for a corresponding network load. Process 600 begins by microcontroller instructing the visual indicator to display the current network load details of the networking cable that were received from the monitoring circuit. This is illustrated in step 605. The microcontroller indicates to the visual indicator to display a color corresponding to the current network traffic load sustained by the networking cable. The instruction sent to the visual indicator is determined based on the current network load. This is illustrated in step 610. The network load ranges may be predefined by a user through programing the microcontroller. For example, if the current network load falls within a high network load range, the microcontroller will instruct the visual indicator to display a red color. This is illustrated in step 615. In this way, the length of the networking cable will be illuminated in red. Alternatively, if the current network load falls within a medium network load range, the microcontroller will instruct the visual indicator to display a yellow color. This is illustrated in step 620. If the current network load range is determined to be within a low network load range, the microcontroller will instruct the visual indicator to display blue. This is illustrated in step 625. Once instructed to display a color, the visual indicator is configured to illuminate the length of the networking cable. In this way, a user can easily determine the current network load of the networking cable, simple by looking at the color, such that no additional device is needed.

In some embodiments, the control unit may further include an actuator configured to intermittently blink the visual indicator. In this way, if multiple networking cables are utilized each having a visual indicator, it may be necessary to distinguish one networking cable from another if they are all displaying a similar color. Thus, a user may selectively activate the actuator in order to blink the visual indicator of the respective cable, thereby allowing the user to easily locate the cable in a complex cable pattern.

In the illustrative embodiment, the process 600 continues by the microcontroller receiving a request to blink the visual indicator. This is illustrated in step 630. The request is initiated by the communicatively coupled actuator being activated by a user. In response to receiving the request to blink the visual indicator, the microcontroller instructs the visual indicator to blink. This is illustrated in step 635. Once instructed, the visual indicator may continue to blink until the actuator is turned off. However, in alternative embodiments, the visual indicator may only blink one or more times, depending on a user defined preference.

Figure 7:
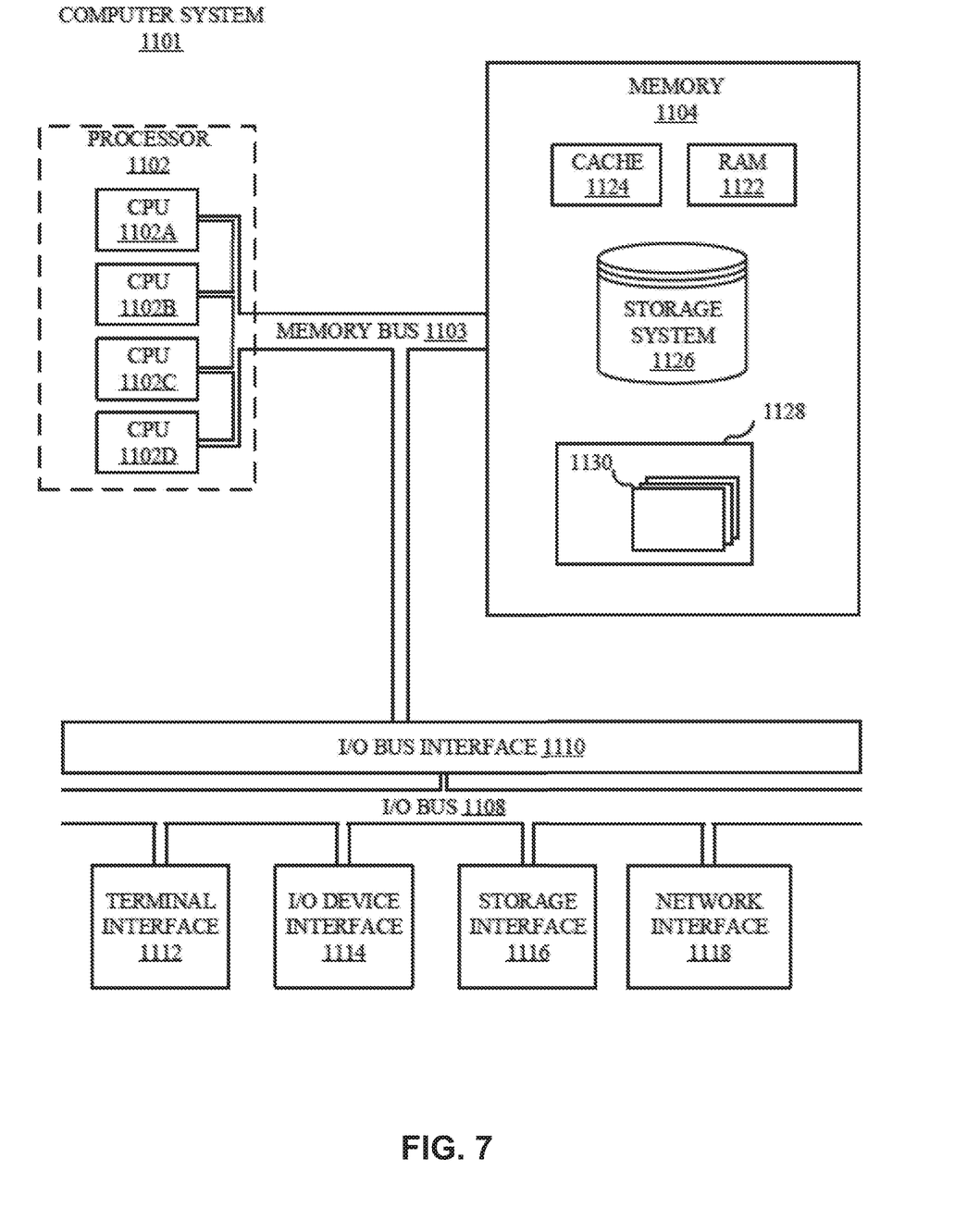
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 500 and 600).

System memory 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 7 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 1101. In some embodiments, however, individual components may have greater or lesser complexity than as represented in FIG. 7, components other than or in addition to those shown in FIG. 7 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding of the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to those skilled in the art. Therefore, it is intended that the following claims be interpreted as covering all such alterations and modifications as fall within the true spirit and scope of the invention.

What is claimed is:

1. A device for displaying a network load of a networking cable, the device comprising:
a microcontroller operably connected to a networking cable, wherein the microcontroller is configured to perform a method comprising:
requesting the network load of the networking cable from a monitoring circuit;
receiving the network load of the networking cable from the monitoring circuit; and
instructing a visual indicator to display the network load of the networking cable, wherein the visual indicator is an RGB LED that includes an optical fiber embedded beneath a transparent panel of an outer sheath that runs along a length of the networking cable.

2. The device of claim 1, wherein instructing the visual indicator to display the network load of the networking cable includes:
generating a prompt instructing the visual indicator to display a color selected from a group consisting of a first color corresponding to a first network load, a second color corresponding to a second network load, and a third color corresponding a third network load.

3. The device of claim 2, wherein the first network load indicates a high network load, the second network load indicates a medium network load, and the third network load indicates a low network load.

4. The device of claim 1, further comprising the networking cable.

5. The device of claim 1, further comprising the monitoring circuit, wherein the monitoring circuit is configured to determine the network load of the networking cable.

6. The device of claim 5, wherein the monitoring circuit and the microcontroller are part of a control unit disposed on the networking cable, and wherein the monitoring circuit is communicatively coupled to the microcontroller using a data bus.

7. The device of claim 1, wherein the network load is received via the networking cable.

8. The device of claim 1, wherein the networking cable is an Ethernet cable and the monitoring circuit is communicatively coupled to a modified RJ45 connector of the Ethernet cable, wherein the modified RJ45 connector is configured to monitor the network load.

9. The device of claim 1, wherein the transparent panel includes a width that is a quarter of a length of a circumference of the outer sheath.

10. The device of claim 1, wherein the device is powered using Power over Ethernet.

11. A method for determining a network load of a networking cable, the method comprising:
requesting, by a microcontroller operably connected to a networking cable, a network load of the networking cable from a monitoring circuit;
receiving, by the microcontroller, the network load of the networking cable from the monitoring circuit; and
instructing, by the microcontroller, a visual indicator to display a color corresponding to the network load of the networking cable, wherein the visual indicator is an RGB LED that includes an optical fiber embedded beneath a transparent panel of an outer sheath that runs along a length of the networking cable.

12. The method of claim 11, wherein instructing the visual indicator to display the network load of the networking cable includes:
generating, by the microcontroller, a prompt instructing the visual indicator to display a color selected from a group consisting of a first color corresponding to a first network load, a second color corresponding to a second network load, and a third color corresponding a third network load.

13. The method of claim 12, wherein the first network load indicates a high network load, the second network load indicates a medium network load, and the third network load indicates a low network load.

14. The method of claim 11, wherein the method further comprises:
receiving, by the microcontroller, a request via an actuator to blink the visual indicator; and
instructing, by the microcontroller and in response to the request, the visual indicator to blink.

15. The method of claim 11, wherein the networking cable is an Ethernet cable.

16. A computer program product comprising a computer readable storage medium having program instructions embodied therewith, the program instructions executable by a processor operably connected to a networking cable to cause the processor to perform a method comprising:
requesting a network load of the networking cable from a monitoring circuit;
receiving the network load of the networking cable from the monitoring circuit; and
instructing a visual indicator to display the network load of the networking cable, wherein the visual indicator is an RGB LED that includes an optical fiber embedded beneath a transparent panel of an outer sheath that runs along a length of the networking cable.

17. The computer program product of claim 16, wherein instructing the visual indicator to display the network load of the networking cable includes:
generating a prompt instructing the visual indicator to display a color selected from a group consisting of a first color corresponding to a first network load, a second color corresponding to a second network load, and a third color corresponding a third network load.

18. The computer program product of claim 17, wherein the first network load indicates a high network load, the second network load indicates a medium network load, and the third network load indicates a low network load.

19. The computer program product of claim 16, wherein the method performed by the processor further comprises:
receiving a request to blink the visual indicator; and
instructing, in response to the request, the visual indicator to blink.

20. The computer program product of claim 16, wherein the networking cable is an Ethernet cable.

* * * * *